United States Patent
Venkatraman et al.

(10) Patent No.: US 9,491,583 B2
(45) Date of Patent: Nov. 8, 2016

(54) METHODS, APPARATUSES, AND DEVICES FOR POSITIONING MOBILE DEVICES USING MEASURED RECEIVER GAIN

(71) Applicant: QUALCOMM Incorporated, San Diego, CA (US)

(72) Inventors: Sai Pradeep Venkatraman, Santa Clara, CA (US); GengSheng Zhang, Cupertino, CA (US); Carlos H. Aldana, Mountain View, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 14/226,739

(22) Filed: Mar. 26, 2014

(65) Prior Publication Data
US 2015/0281908 A1    Oct. 1, 2015

(51) Int. Cl.
*H04W 24/00* (2009.01)
*H04W 4/04* (2009.01)
*H04W 52/24* (2009.01)
*H04W 64/00* (2009.01)
*H04W 84/12* (2009.01)

(52) U.S. Cl.
CPC ............ *H04W 4/04* (2013.01); *H04W 52/245* (2013.01); *H04W 64/00* (2013.01); *H04W 84/12* (2013.01)

(58) Field of Classification Search
CPC . H04W 64/00; H04W 16/20; H04W 52/242; G01S 5/021; G01S 5/06; G01S 5/0036; G01S 5/26; H04B 17/21; H04B 17/318; H04B 17/24
See application file for complete search history.

(56) References Cited

U.S. PATENT DOCUMENTS

| | | | |
|---|---|---|---|
| 8,442,553 B2 | 5/2013 | Cardona et al. | |
| 2009/0005063 A1* | 1/2009 | Malik | H04W 64/00 455/456.1 |
| 2009/0046633 A1 | 2/2009 | Thomson | |
| 2010/0246419 A1 | 9/2010 | Batta et al. | |
| 2011/0163917 A1 | 7/2011 | Lundgren et al. | |
| 2012/0252502 A1 | 10/2012 | Shiotsu et al. | |
| 2013/0053056 A1 | 2/2013 | Aggarwal et al. | |
| 2013/0109413 A1 | 5/2013 | Das et al. | |
| 2013/0203438 A1* | 8/2013 | Shin | H04W 64/003 455/456.1 |

FOREIGN PATENT DOCUMENTS

WO    WO-0069198 A1    11/2000

OTHER PUBLICATIONS

International Search Report and Written Opinion—PCT/US2015/022081—ISA/EPO—Jul. 23, 2015.
(Continued)

*Primary Examiner* — Charles Appiah
*Assistant Examiner* — Edward Zhang
(74) *Attorney, Agent, or Firm* — Berkeley Law & Technology Group, LLP

(57) ABSTRACT

Methods, apparatuses, and devices are disclosed that may be used to estimate a location of a mobile device using, for example, one more receiver gains that may bring about adjustment of received signal strength indications of a radio heatmap. Such adjustment may allow a mobile device to accurately estimate a present location of a mobile device using, for example, a radio heatmap.

30 Claims, 8 Drawing Sheets

(56) References Cited

OTHER PUBLICATIONS

Retscher G., et al., "Performance and Accuracy Test of the WLAN Indoor Positioning System "ipos"", Jan. 1, 2006, pp. 7-16, XP55114449, Retrieved from the Internet: URL: http://www.wpnc. net/fileadmin/WPNC06/Proceedings/6_Performance_and_Accuracy_Test_of_the_WLAN_Indoor_Positioning_System_IPOs.pdf [retrieved on Apr. 16, 2014] p. 7, paragraph 1 pp. 8-9, paragraphs 2, 2.1.

* cited by examiner

METHODS, APPARATUSES, AND DEVICES FOR POSITIONING MOBILE DEVICES USING MEASURED RECEIVER GAIN

BACKGROUND

1. Field

The subject matter disclosed herein relates to mobile electronic devices, and, more particularly, to methods, apparatuses, and articles of manufacture that may be used to estimate a location of a mobile device using, for example, a radio heatmap of an indoor area.

2. Information

The global positioning system (GPS) and other like satellite positioning systems (SPSs) have enabled navigation services for mobile handsets in many types of outdoor environments. However, since satellite signals may not be reliably received and/or acquired in some indoor environments, different techniques may be employed to enable indoor navigation services. For example, a mobile device may typically obtain an estimated location by measuring ranges to three or more wireless access points that may be positioned at known locations. Such ranges may be measured, for example, by obtaining a media access control identification (MAC ID) address from signals acquired from such access points and measuring one or more characteristics of received signals. In one example, round trip signal delay may be measured between a mobile device and a wireless access point, which may be used to compute an estimated location of the mobile device.

However, in some indoor environments, multipath interference may occur if signals propagate between mobile devices and wireless access points along direct and indirect paths. In such instances, transmitted signals arriving at a mobile device by way of direct and indirect paths may interfere with one another, thus giving rise to degradations in capability of the mobile device to compute an estimated location. In such instances, round-trip signal delay measurements may be complemented through a use of one or more radio heatmaps, which may be utilized in place of, or in addition to, round trip signal delay measurements. Radio heatmaps may be generated with respect to individual wireless access points and may permit a mobile device to estimate its location within an indoor area by comparing received signal strength with expected signal strengths from the radio heatmap. However, in some instances, radio heatmaps may be generated under conditions that, from time to time, may fluctuate. Such fluctuations may negatively impact accuracy of radio heatmaps and thus bring about errors in position estimation of mobile devices.

SUMMARY

Briefly, particular implementations may be directed to a method comprising, at a mobile device, receiving one or more messages from a wireless access point, the received one or more messages comprising an indication of received first signal strength of one or more first signals transmitted by the mobile device and acquired at the wireless access point. The method may further comprise measuring a second signal strength, the second signal strength corresponding to strength of one or more second signals used to transmit at least one of the received one or more messages and computing a receiver gain of the mobile device based, at least in part, on the second signal strength and the indication of the first signal strength. The method may further comprise applying the receiver gain to compute an estimated location of the mobile device.

Another particular implementation may be directed to a mobile device comprising a receiver configured to acquire one or more signals from a communications channel, the one or more signals used to transmit one or more messages from a communications network. The mobile device may additionally comprise one or more processors coupled to the receiver configured to measure, at the mobile device, a signal strength of the one or more signals acquired from the communications channel and to compute a receiver gain of the mobile device based, at least in part, on the signal strength measured at the mobile device of one or more signals acquired from the communications channel and an indication of signal strength of one or more signals measured at a wireless access point, the indication of signal strength measured at the wireless access point being provided using the one or more messages. The one or more processors may additionally apply the receiver gain to compute an estimated location of the mobile device.

Another particular implementation may be directed to an article comprising a storage medium comprising machine-readable instructions stored thereon which are executable by one or more processors of a mobile device comprising code to obtain of one or more messages received from a communications channel and to measure a signal strength at the mobile device of one or more signals used to transmit at least one of the received one or more messages. Code may additionally compute a receiver gain of the mobile device based, at least in part, on the signal strength measured at the mobile device and an indication of signal strength of one or more signals transmitted by the mobile device and measured at a wireless access point, the indication of the signal strength measured at the wireless access point being provided in at least one of the received one or more messages. Code may additionally apply the receiver gain to compute an estimated location of the mobile device.

Another particular implementation may be directed to a mobile device, comprising means for receiving one or more messages from a communications channel and means for measuring, at the mobile device, a signal strength of one or more first signals used to transmit at least one of the received one or more messages. The mobile device may additionally comprise means for computing a receiver gain of the mobile device based, at least in part, on the signal strength measured at the mobile device of the one or more first signals and an indication of signal strength measured at a wireless access point of one or more second signals transmitted by the mobile device, the indication of signal strength measured at the wireless access point being provided in the received one or more messages. The mobile device may further comprise means for applying the receiver gain to compute an estimated location of the mobile device.

Another particular implementation may be directed to a method comprising, at a mobile network, estimating a location of a mobile device within an indoor area and computing an uncertainty of the estimated location of the mobile device. The method may additionally comprise transmitting, to the mobile device, the estimated location based, at least in part, on whether the computed uncertainty approaches a threshold, and, applying, at the mobile device, the estimated location to estimate a receiver gain of the mobile device. Certain implementations may further comprise measuring signal strength of one or more messages transmitted from the mobile device and received at one or more wireless access points, and the one or more wireless access points transmitting the measured signal strength to the network-based positioning resource. Certain limitations may further comprise determining that the computed uncertainty approaches the threshold based, at least in part, on input signals from an imaging device to provide one or more observations of at least one feature proximate to the mobile device.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
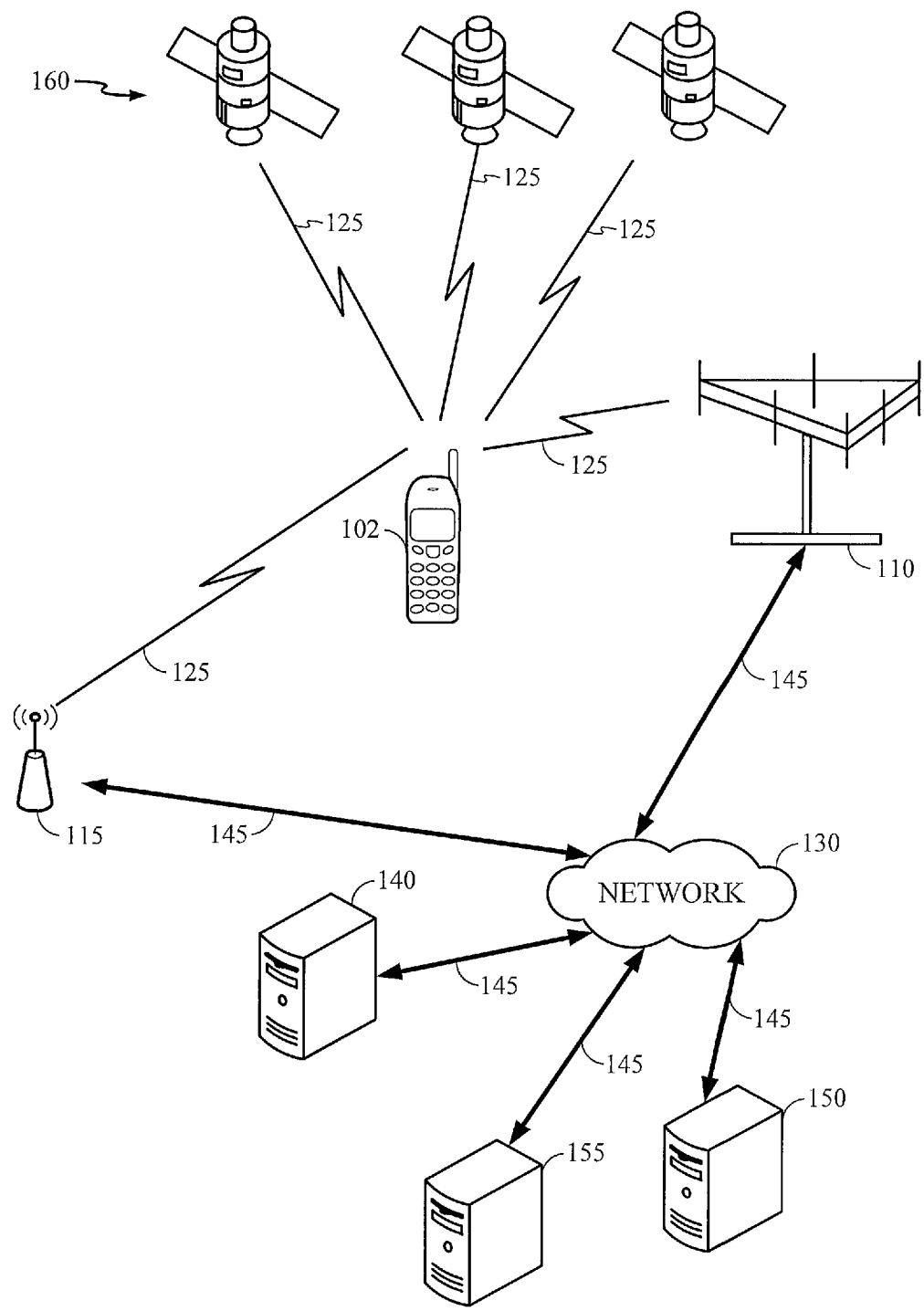
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms may be used interchangeably and may refer to any kind of special purpose computing platform or apparatus that may from time to time occupy a position that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be referred to simply as "mobile devices," may include, for example, cellular telephones, smart telephones, personal digital assistants, wearable computers, wrist phones, laptop computers, personal entertainment systems, tablet personal computers, personal audio or video devices, personal navigation devices, or the like. It should be appreciated, however, that these are merely examples of mobile devices that may be used, at least in part, to implement one or more operations and/or techniques for estimating a position of a mobile device, for example, and that claimed subject matter is not limited in this respect. It should also be noted that the terms "position" and "location" may be used interchangeably herein.

As used herein, a "radio heatmap" or simply a "heatmap" may comprise a two-dimensional array representing discrete locations of an indoor area and corresponding values of expected and/or predicted characteristics, such as signal strength, of electromagnetic signals transmitted from a wireless transmitter and received at those locations. In other instances, for example, a heatmap may comprise an array of discrete locations of an indoor area and corresponding values of expected and/or predicted round trip signal delays between a mobile device and a wireless transmitter. Expected signal strength values of a radio heatmap may be generated by way of, for example, prior measurement and/or computation and may be stored in a database accessible upon or soon after entering an indoor area. For example, prior to a mobile device entering an indoor area, an indoor area may be surveyed and observed characteristics of wireless signals indicative of received signal strength, and/or round trip signal delay, may be collected and/or compiled.

In many instances, a heatmap may be assembled for an individual indoor wireless transmitter, such as a wireless access point. A heatmap may permit a mobile device to estimate its location within an indoor area by relating expected and/or predicted RSSI values with a measured RSSI. In embodiments, signal strength values of a heatmap may be referenced, for example, to a convenient unit of measurement, such as decibels (dB) relative to 1.0 milliwatt (dBm). Thus, for example, an indoor heatmap may comprise an array of locations and signal strength values (e.g., such as −50 dBm, −80 dBm, −100 dBm, and so forth) corresponding to particular locations.

As used herein, the term "receiver gain" may refer to an increase or decrease in received signal strength measured at a mobile device relative to predicted signal strength from a radio heatmap. In embodiments, receiver gain may be expressed using negative values, positive values, or values that approximate 0.0. Thus, in one possible example, if a value for received signal strength at a particular location, as indicated on a radio heatmap, may be approximated as −40.0 dBm, and a receiver of a mobile device measures signal strength of approximately −30.0 dBm, then the receiver may observe a gain of approximately 10.0 dB. Receiver gain of a mobile device may be brought about by factors such as an increase or a decrease in antenna gain of a wireless transmitter and/or of a mobile device, an unexpected increase in transmitter power, and so forth.

As previously discussed, a mobile device may make use of a radio heatmap to estimate its location by relating values for received signal strength with signal strength values from a radio heatmap. Use of radio heatmaps may enable additional services and/or provide other benefits, such as determining locations of wireless transmitters, for example, and claimed subject matter is not limited in this respect.

At times, however, while at a particular location, a mobile device may measure signal strength of a wireless signal that may differ considerably in comparison with signal strength values from a radio heatmap comprising expected and/or predicted for the particular location. Such a deviation in measured signal strength may give rise to significant errors in estimating a location of a mobile device using the radio heatmap. Deviations in measured signal strength may be brought about by changes in antenna gain of the transmitter and/or the receiver of a mobile device and responsive to other factors, and claimed subject matter is not limited in this respect.

In embodiments, prior to, or as part of, estimating a location of a mobile device by way of utilizing a radio heatmap, a mobile device may measure receiver gain. As previously discussed, receiver gain may refer to an increase or decrease in observed signal strength relative to one or more expected and/or predicted values for received signal strength at a particular indoor location as indicated on a radio heatmap. Thus, for example, prior to estimating a location of a mobile device utilizing a radio heatmap, a mobile device may transmit a "probe request message" to a transceiver, such as wireless access point, which may respond with a "probe response message." In some embodiments, a probe request message may comprise one or more indications of transmit power used by a mobile device to transmit the probe request message.

Responsive to receipt of a probe request message transmitted by a mobile device, a transceiver, such as a wireless access point, may generate a probe response message comprising one or more indications of transceiver transmit power, one or more indications of transceiver antenna gain, one or more indications of signal strength for signals received at the transceiver, and so forth. As described in detail below, a mobile device may utilize measurements and/or indications present in a probe response message to compute an estimate of mobile device receiver gain. A computed estimate of mobile device receiver gain may be applied to one or more signal strength values of a radio heatmap for estimating a location of the mobile device. A probe request message and probe response message may comprise additional measurements and/or indications other than those enumerated above, and claimed subject matter is not limited in this respect.

In embodiments, responsive to receipt of a probe response message, a mobile device may compute a receiver gain utilizing one or more signal strength measurements and/or other types of indications of signal strength. A receiver gain may be utilized to compute one or more adjustments to signal strength values of a radio heatmap. Adjustments may represent differences between received signal strengths and expected and/or predicted values for signal strength signal strengths from a radio heatmap. Adjustments may be applied to radio heatmap values, which may permit a mobile device to estimate its location with greater accuracy despite fluctuations (e.g., increases or decreases) in output power of a transmitter, such as a wireless access point. Adjustments applied to radio heatmap values may permit a mobile device to perform other actions, and claimed subject matter is not limited in this respect.

In certain embodiments, a mobile device may transmit a probe request message comprising a Link Measurement Request Frame in accordance with IEEE Standard 802.11, Part 11: Wireless LAN Medium Access Control (MAC) and Physical Layer (PHY) Specifications. Responsive to receipt of a Link Measurement Request Frame, a wireless transceiver, such as a wireless access point, may transmit a probe response message comprising a Link Measurement Report Frame in accordance with the aforementioned IEEE Standard. A Link Measurement Report Frame may comprise a computed estimate of a communications link margin between a mobile device and a wireless transceiver. In particular embodiments, a computed estimate of a communications link margin may be utilized to derive strength of a received signal transmitted by a mobile device and received by a wireless transceiver, such as a wireless access point.

In embodiments, a mobile device may store indicators of received signal strength for signals transmitted by one or more wireless transceivers, such as wireless access points, and received by the mobile device. Stored signal strength indicators may be transmitted to a network-based positioning resource. A network-based positioning resource, which may be coupled to a map server, may estimate locations of mobile devices in an indoor area. Based, at least in part, on indications of received signal strength and based, at least in part, on position estimates of mobile devices, a network-based positioning resource may correlate received signal strengths with position estimates. In embodiments, if a network-based positioning resource estimates a position of a mobile device with uncertainty that is below a threshold, the network based positioning resource may transmit an estimated location to the mobile device. Responsive to such transmission, the mobile device may update its estimated location and/or update an estimate of mobile device receiver gain. Responsive to receipt of an estimated location, a mobile device may compare an actual received signal strength with an expected received signal strength indication from, for example, a radio heatmap. Such comparison may give rise to a mobile device computing an estimate of mobile device receiver gain.

FIG. 1 is a schematic diagram of a network topology 100 according to an embodiment. As described below, one or more processes or operations positioning mobile devices using measured receiver gain may be implemented in a signal environment that may be utilized by mobile device 102, for example. It should be appreciated that network topology 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to any particular type of outdoor or indoor implementation. For example, at times, one or more operations or techniques described herein may be performed, at least in part, in an environment that may comprise indoor environments, dense urban environments, partially indoor/outdoor environments, such as amphitheaters, partially enclosed sports stadiums, and so forth, and claimed subject matter is not limited in this respect.

As illustrated, network topology 100 may comprise, for example, one or more space vehicles 160, cellular base station 110, wireless transmitter 115, etc. capable of communicating with mobile device 102 via wireless communication links 125 in accordance with one or more protocols. Space vehicles 160 may be associated with one or more satellite positioning systems (SPS), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Cellular base station 110, wireless transmitter 115, etc. may be of the same or similar type, for example, or may represent different types of devices, such as access points, radio beacons, cellular base stations, femtocells, or the like, depending on an implementation. At times, one or more wireless transmitters, such as wireless transmitters 115, for example, may be capable of transmitting as well as receiving wireless signals.

In some instances, one or more cellular base stations 110, wireless transmitters 115, etc. may, for example, be operatively coupled to a network 130 comprising one or more wired or wireless communications or computing networks capable of transmitting messages including items, such as an electronic digital map, that may be relevant to a mobile device user's estimated location via one or more wireless communication links 125, 145, and so forth. A position of mobile device 102 may be estimated by relating received signal strength with expected and/or predicted values from a radio heatmap.

Even though a certain number of computing platforms or devices are illustrated herein, any number of suitable computing platforms or devices may be implemented to facilitate or otherwise support one or more techniques or processes associated with network topology 100. For example, at times, network 130 may be coupled to one or more wired or wireless communications networks (e.g., Wi-Fi, etc.) so as to enhance a predominantly indoor coverage area for communications with mobile device 102, one or more base transceiver stations 110, wireless transmitters 115, servers 140, 150, 155, or the like. In some instances, network 130 may facilitate or support femtocell-based operative regions of coverage, for example. Again, these are merely example implementations, and claimed subject matter is not limited in this regard.

Figure 2:
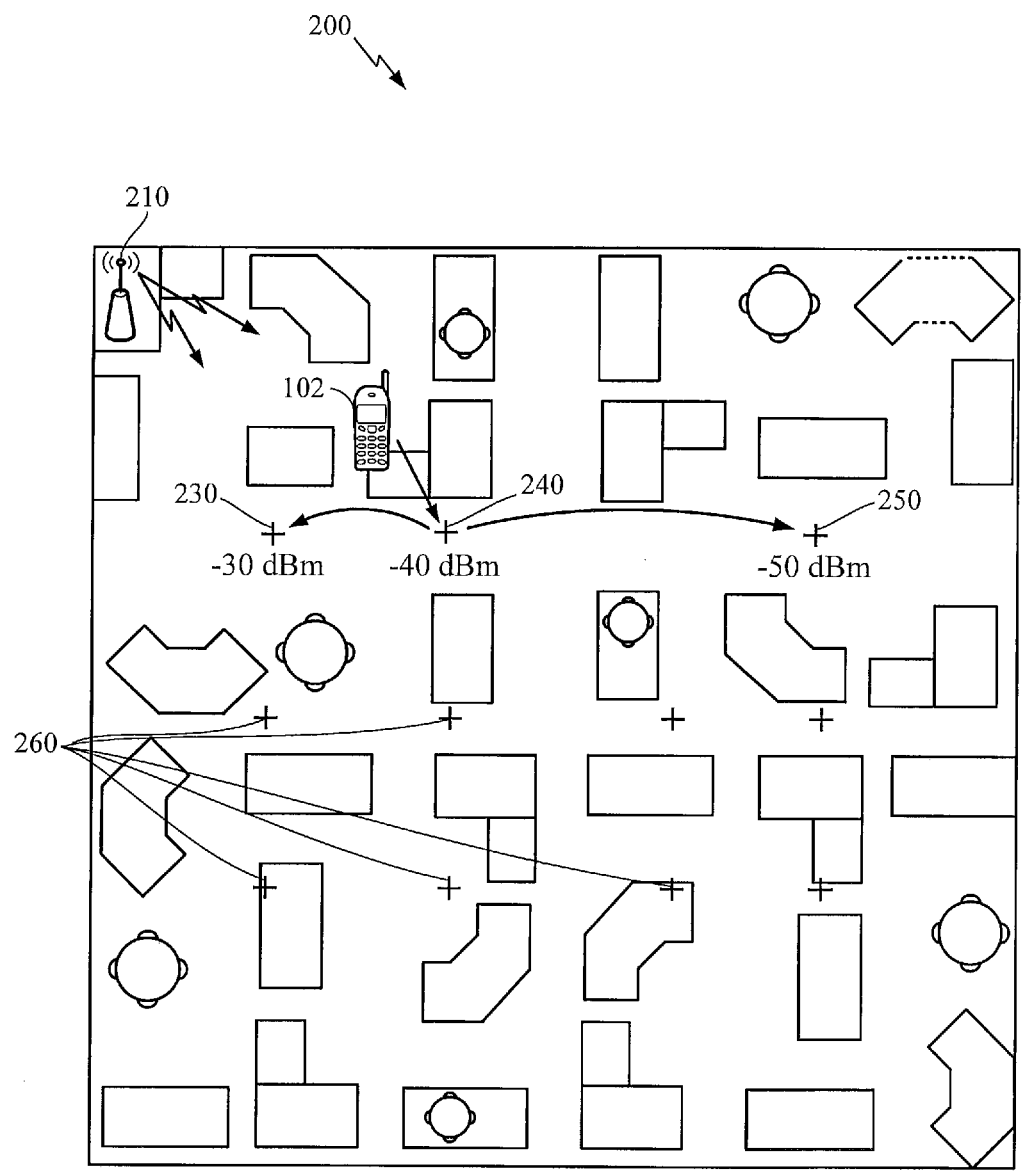
FIG. 2 is a diagram of an indoor area showing a type of radio heatmap for use with positioning mobile devices using measured receiver gain according to an embodiment.

FIG. 2 is a diagram of an indoor area showing a type of radio heatmap for use with positioning mobile devices using measured receiver gain according to an embodiment. In FIG. 2, schematic diagram 200 shows wireless access point 210 at an upper left portion of an indoor area 205, which may transmit signals in the direction of an interior portion of area 205. Although one wireless access point is shown in FIG. 2, any number of wireless transceivers may be in at least occasional communication with mobile device 102, and claimed subject matter is not limited to mobile devices communicating with any particular number of wireless access points. In embodiments, a wireless communications network, which may comprise wireless access point 210, may utilize one or more positioning assistance approaches to mobile devices. Such positioning approaches may comprise, for example, use of a radio heatmap, which may be overlaid on an electronic digital map of area 205, in which a mobile device may estimate its location by relating one or more indications of received signal strength with, for example, previously measured signal strength indicators stored in a database. A wireless communications network may employ additional approaches toward locating mobile devices, and claimed subject matter is not limited in this respect.

In an embodiment, area 205 may be representative of an indoor area, such as an indoor office, a portion of a shopping mall, or the like. At location 230, a previously expected and/or predicted value for signal strength of signals transmitted from wireless access point 210 may correspond to approximately −30.0 dBm. At location 240, a previously expected and/or predicted value for signal strength from wireless access point 210 may correspond to approximately −40.0 dBm. Likewise, at location 250, a previously expected and/or predicted value for signal strength from wireless access point 210 may correspond to approximately −50.0 dBm. At other locations, such as locations 260 and potentially numerous other locations overlaid on an electronic digital map of area 205, such as those identified using a "+" symbol, previously expected and/or predicted values of signal strength may be identified. Area 205 may include other wireless transceivers, which may be similar to wireless access point 210, and claimed subject matter is not limited to any particular number of wireless transceivers.

In one possible embodiment, a mobile device user colocated with mobile device 102 may attempt to estimate his or her location within area 205 based, at least in part, on received signal strength indications. Thus, for example, mobile device 102, which may be positioned at or proximate with location 240 in FIG. 2, may estimate its position by measuring received signal strength of a wireless signals transmitted from wireless access point 210. Accordingly, for the example of FIG. 2, if mobile device 102 measures signals having amplitude of approximately −40.0 dBm transmitted from wireless access point 210, the mobile device may estimate its position to be at or proximate with location 240.

As previously discussed, transmit power output of wireless transceivers, such as wireless access point 210 may, at times, unexpectedly fluctuate by several decibels. Thus, for example, wireless access point 210 may at times transmit signals at greater levels, such as approximately 23.0 dBm (approximately 200.0 milliwatts). At other times, wireless access point 210 may transmit signals at lower levels, such as approximately 13.0 dBm (approximately 20.0 milliwatts). Responsive to an approximately 10.0 dB decrease in output power from wireless access point 210, mobile device 102 may measure a signal strength of approximately −50.0 dBm, which may correspond to location 250 on a heatmap overlaid on an electronic digital map of area 205. Thus, as shown in FIG. 2, in response to a decrease in transmit power output of wireless access point 210, mobile device 102 may inaccurately estimate its position as being at, or proximate with, location 250. Likewise, responsive to an unexpected approximately 10.0 dB increase in power output from wireless access point 210, mobile device 102, at or near location 240, may measure a signal strength of, for example, approximately −30.0 dBm. Thus, in this instance, mobile device 102 may inaccurately estimate its position as being at, or proximate with, location 230. It should be noted that factors other than transmit power output of wireless access point 210 may affect signal strength measured by mobile device 102, such as changes in antenna gain of the wireless access point and/or antenna gain of the mobile device, rearrangement of obstructions within area 205, and so forth, and claimed subject matter is not limited in this respect.

Figure 3:
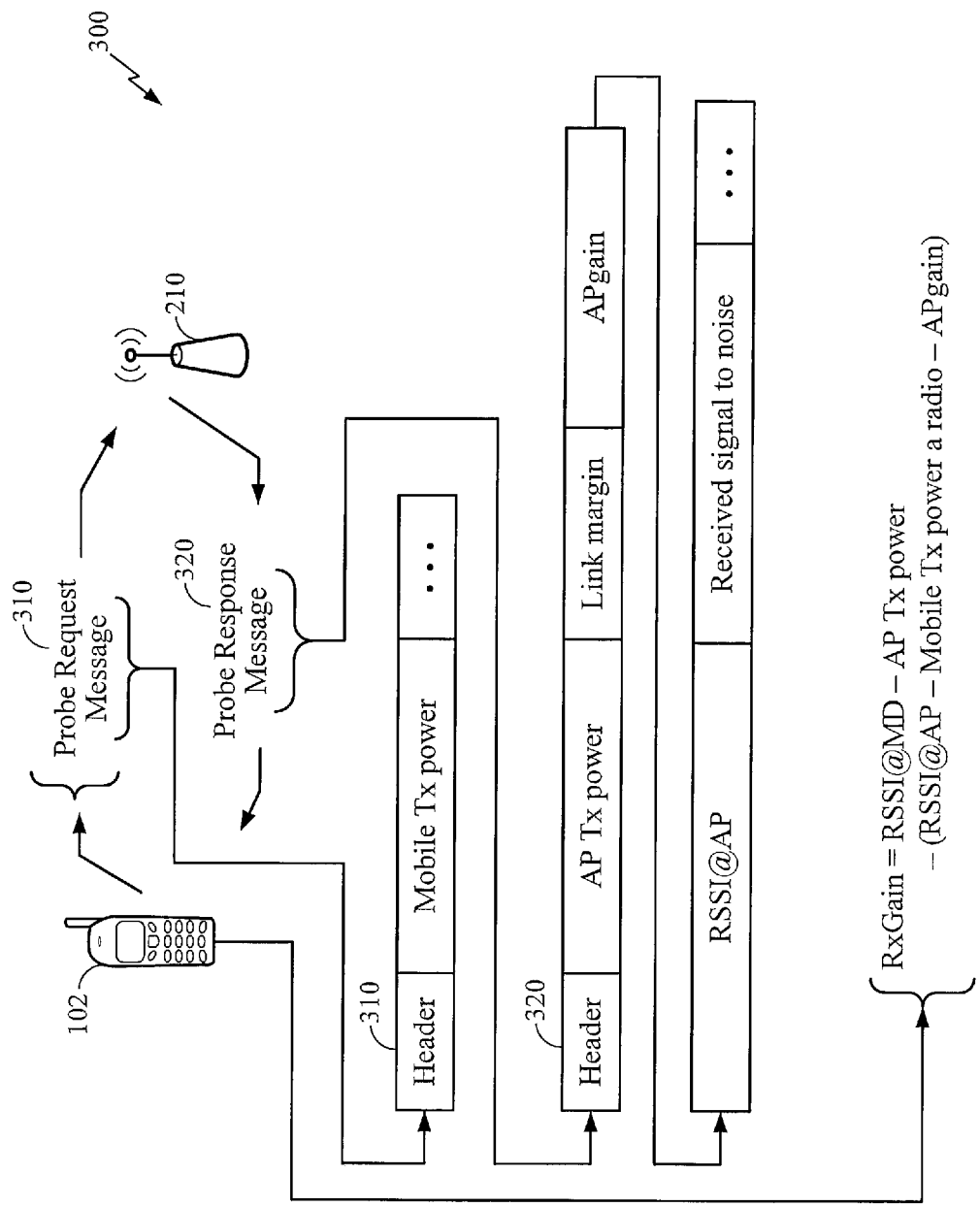
FIG. 3 is a schematic diagram showing communication among a mobile device and a wireless transmitter in positioning a mobile device using measured receiver gain according to an embodiment.

FIG. 3 is a schematic diagram 300 showing communication among a mobile device and a wireless transmitter in positioning the mobile device using measured receiver gain according to an embodiment. In FIG. 3, mobile device 102, which may be located in an indoor area, such as area 205 of FIG. 2, may transmit probe request message 310, for example, to a wireless transmitter, such as wireless access point 210. In the embodiment of FIG. 3, probe request message 310 may comprise header parameters, which may include binary encoded signals conveying a message category, one or more instructions that may direct a wireless access point to perform certain actions, and so forth. Probe request message 310 may additionally comprise an indication comprising a binary encoded value of transmit power used by mobile device 102 to transmit the probe request message (Mobile Tx power). In one possible example, Mobile Tx power of probe request message 310 may comprise an indication, such as a binary encoded value, that may represent approximately 17.0 dBm (approximately 50.1 milliwatt). In addition, probe request message 310 may direct wireless access point 210 to respond with, for example, probe response message 320. Mobile device 102 may transmit additional messages to, and receive additional messages from, wireless access point 210 in addition to probe and probe response messages 310/320, and claimed subject matter is not limited to transmitting and receiving probe and/or probe responses.

Probe response message 320, which may be transmitted by wireless access point 210 responsive to receipt of probe request message 310, may comprise header parameters and an indication of transmit power used by wireless access point 210 to transmit the probe response message. In embodiments, an indication of transmit power level used by access point 210 (AP Tx power) may comprise a binary encoded value of, for example, approximately 10.0 dBm to approximately 23.0 dBm (approximately 10.0 milliwatt to approximately 200.0 milliwatt). Probe response message 320 may further comprise an indication, such as a binary encoded value (APgain), corresponding to a receive and/or a transmit antenna used for wireless communications with, for example, mobile device 102. Probe response message may additionally comprise an indication, such as a binary encoded value, of a link margin for a wireless communications link between mobile device 102 and wireless access point 210, for example. In embodiments, link margin may identify a ratio of received signal power to minimum required signal power, for example. Wireless access point 210 may incorporate a data rate into computation of link margin, such as 11 Mbit/s, for communicating between mobile device 102 and channel conditions, which may include interference.

In certain embodiments APgain may be used to identify a particular antenna number or a particular configuration of multiple antennas characterized by a fixed relative position, a fixed relative direction, and/or a fixed peak gain for a position and direction. APgain may be used by a mobile device, such as mobile device 102, to indicate a gain value, such as approximately –1.0 dB, 1.0 dB, 2.0 dB that may correspond to one or more particular antenna configurations. In other embodiments, APgain may be set to approximately 0.0, and claimed subject matter is not limited to any particular value or range of values for APgain.

Probe response message 320 may further comprise an indication, such as a binary encoded value, for received signal strength (RSSI@AP) for signals received at access point 210. For example, in one possible embodiment, received signal strength may comprise a value representing, for example, between approximately –30.0 dBm and approximately –80.0 dBm. In embodiments, probe response message 320 may additionally comprise an indication, such as a binary encoded value, of received signal to noise ratio, which may provide an indication of signal quality.

In particular embodiments, upon receiving, for example, probe response message 320, mobile device 102 may measure received signal strength of probe response message 320 (RSSI@MD). Mobile device 102 may perform one or more computing operations to calculate receiver gain utilizing the aforementioned quantities, which may be summarized in expression (1), below and illustrated in FIG. 3:

$$Rx\text{Gain} = RSSI@MD - AP\ Tx\ \text{Power} - (RSSI@AP - \text{Mobile } Tx\ \text{Power} - AP\text{gain}) \quad (1)$$

In which, indications for received signal strengths at a mobile device and at an access point, such as RSSI@MD and RSSI@AP, may be expressed in dBm. Indications for transmit power used by a mobile device and by an access point, such as AP Tx Power and Mobile Tx Power, respectively, may also be expressed in dBm. Indications of antenna gains, such as APgain, may be expressed in dB. However, in other embodiments, indications of quantities may be expressed in other convenient units of measurement such as, for example, decibels relative to 1.0 watt (dBW), decibels above 1.0 microwatt (dBpW), and so forth, and claimed subject matter is not limited in this respect.

Figure 4:
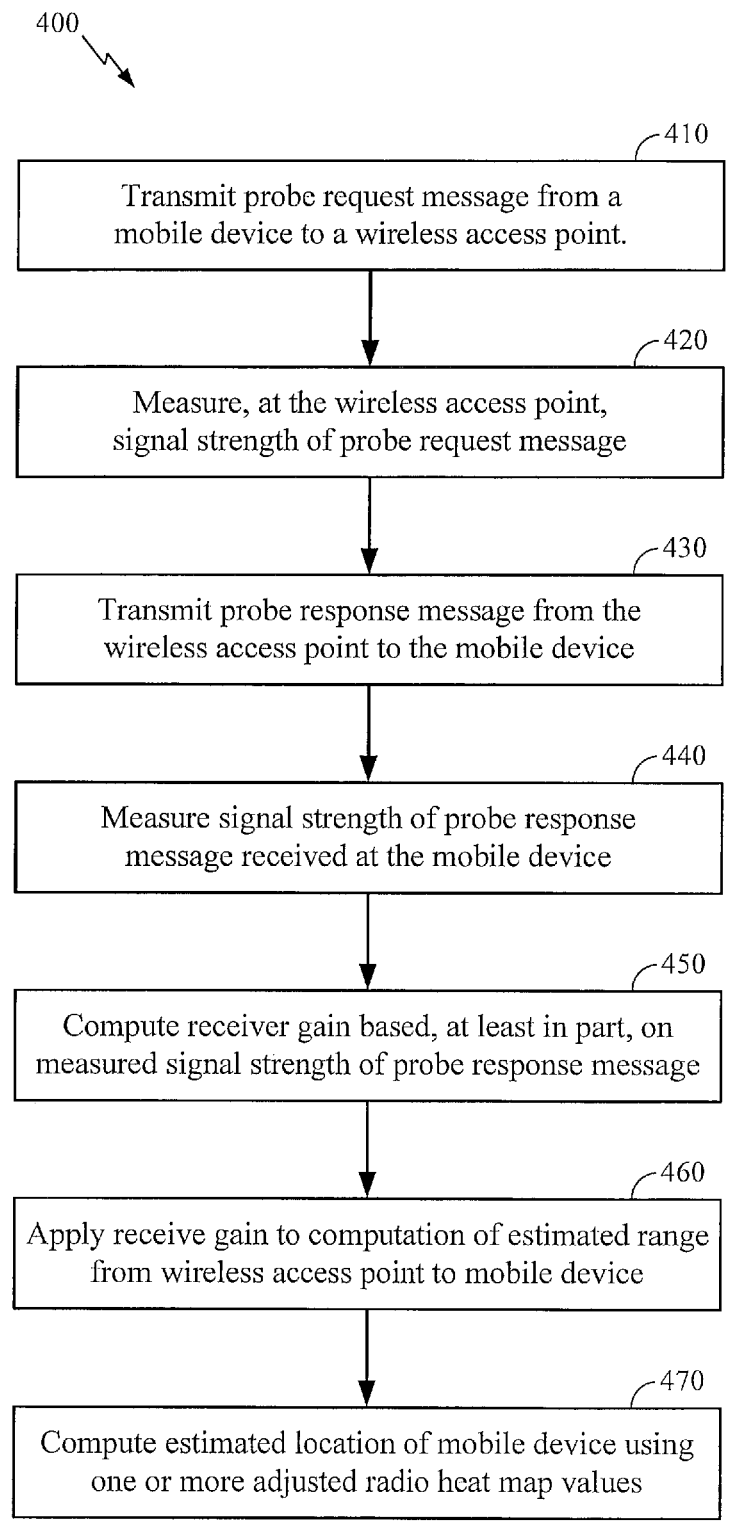
FIG. 4 is a flow diagram for a method for estimating a location of a mobile device using measured receiver gain according to an embodiment.

FIG. 4 is a flow diagram 400 for a method for estimating a location of a mobile device using measured receiver gain according to an embodiment. Although the method of FIG. 4 may be performed at, for example, mobile device 102 in communication with one or more wireless access points to compute receiver gain, in other embodiments, the method of FIG. 4 may be performed at or by other types of wireless devices in communication with one or more transceivers, and claimed subject matter is not limited in this respect. Example implementations, such as those described in FIG. 4, may include blocks in addition to those shown and described, fewer blocks, blocks occurring in an order different than may be identified, or any combination thereof.

The method of FIG. 4 may begin at block 410, which may comprise transmitting one or more probe request messages, which may be similar to probe request message 310 of FIG. 3, to a transceiver, such as a wireless access point. In an embodiment, a probe request message may comprise an indication, such as a binary encoded value, for transmit power used by a mobile device (e.g., Mobile Tx power) to transmit the probe request message. At block 420, a wireless access point may measure signal strength of a probe request message transmitted by a mobile device (e.g., RSSI@AP). At block 430, a wireless access point may transmit a probe response message to a mobile device. A probe response message may comprise, for example, an indication of transmit power used by a wireless access point (e.g., AP Tx power), an indication of received signal strength of the probe request message transmitted by a mobile device and received at the wireless access point (e.g., RSSI@AP), and an indication of receiver and/or transmitter antenna gain of the wireless access point (e.g., APgain). At block 440, a mobile device may measure signal strength of a probe response message transmitted by a wireless access point (e.g., RSSI@MD). At block 450, a mobile device may compute receiver gain based, at least in part, on measured signal strength of a received probe response message, one or more indications of transmit power used by an access point, one or more indications of transmit power used by a mobile device, one or more indications of received signal strength of a message received at an access point, and one or more indications representing antenna gain. In embodiments, a mobile device may utilize expression (1) to compute receiver gain. The method of FIG. 4 may continue at block 460, which may comprise applying computed receiver gain to one or more signal strength values of a radio heatmap. At block 470, adjusted signal strength values of a radio heatmap may be used to compute an estimated location of a mobile device.

In certain embodiments, the method of FIG. 4 may utilize one or more Link Measurement Request message frames in place of, or in addition to, a probe request message. A Link Measurement Request message may conform to IEEE Standard 802.11, Part 11: Wireless LAN Medium Access Control (MAC) and Physical Layer (PHY) Specifications. Certain embodiments may also make use of a Link Measurement Report Frame in place of, or in addition to, a probe response message in accordance with the aforementioned IEEE Standard 802.11. A Link Measurement Report frame may comprise a Transmit Power Control report to encode transmit power used to transmit the link measurement report frame from a wireless access point. A Transmit Power Control report may also comprise, at least in some embodiments, a link margin that may provide a measure of quality of a communications channel between a mobile device and a wireless access point.

Figure 5:
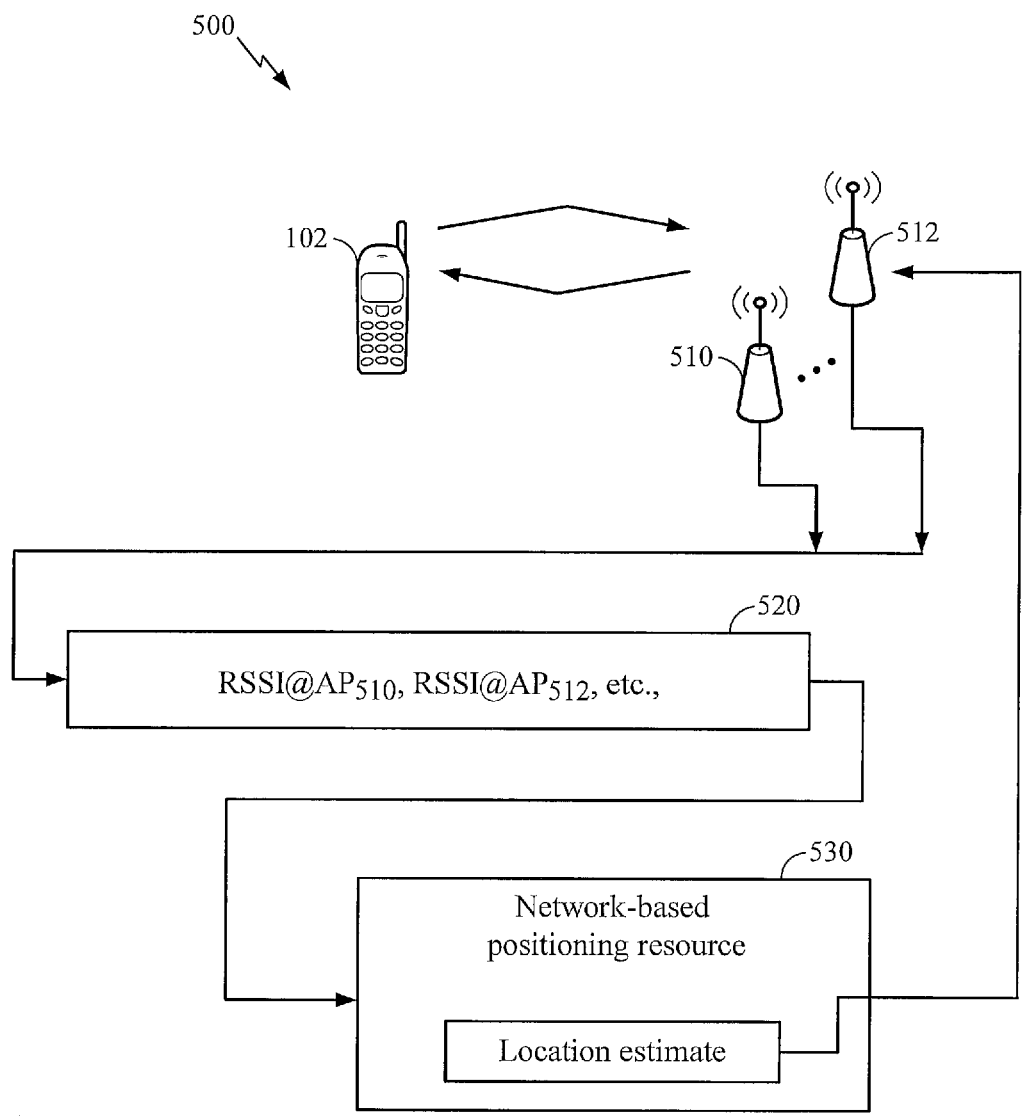
FIG. 5 is a schematic diagram showing communication among a mobile device and wireless transmitters for positioning a mobile device according to an embodiment.

FIG. 5 is a schematic diagram 500 showing communication among a mobile device and wireless transmitters for positioning a mobile device according to an embodiment. In FIG. 5, one or more of access points 510 and 512 may at times receive signals from mobile device 102. Responsive to receipt of signals from mobile device 102, one or more of access points 510 and 512 may transmit an indication of received signal strength (e.g., RSSI@MD of FIG. 3) to network-based positioning resource 530. Responsive to receipt of one or more received signal strength from access points 510, and/or 512, for example, network-based positioning resource 530 may estimate location of mobile device 102, for example.

In particular embodiments, network-based positioning resource 530 may compute an uncertainty in position estimation for mobile device 102 prior to transmitting an estimated position. For example, if access point 510 and/or access point 512 measure a relatively large value for RSSI of signals from mobile device 102, network-based positioning resource 530 may determine that mobile device 102 is currently positioned proximate with access point 510 and/or access point 512. In one instance, if several RSSI measurements are performed by an access point over an extended period of time, such as approximately 30.0 seconds, approximately 1.0 minutes, approximately 2.0 minutes etc., a network-based positioning resource may increase confidence in a position estimate. In other instances, for example, network-based positioning resource 530 may receive input signals from an imaging device, such as a camera of a mobile device, which may provide observations of one or more landmarks, such as doorways, entrances, exit signs, storefronts, or any other feature in an environment proximate to the mobile device. It should be noted that network-based positioning resource 530 may increase a confidence value for a position estimate of mobile device 102 based on additional measurements and/or computations, and claimed subject matter is not limited in this respect.

Figure 6:
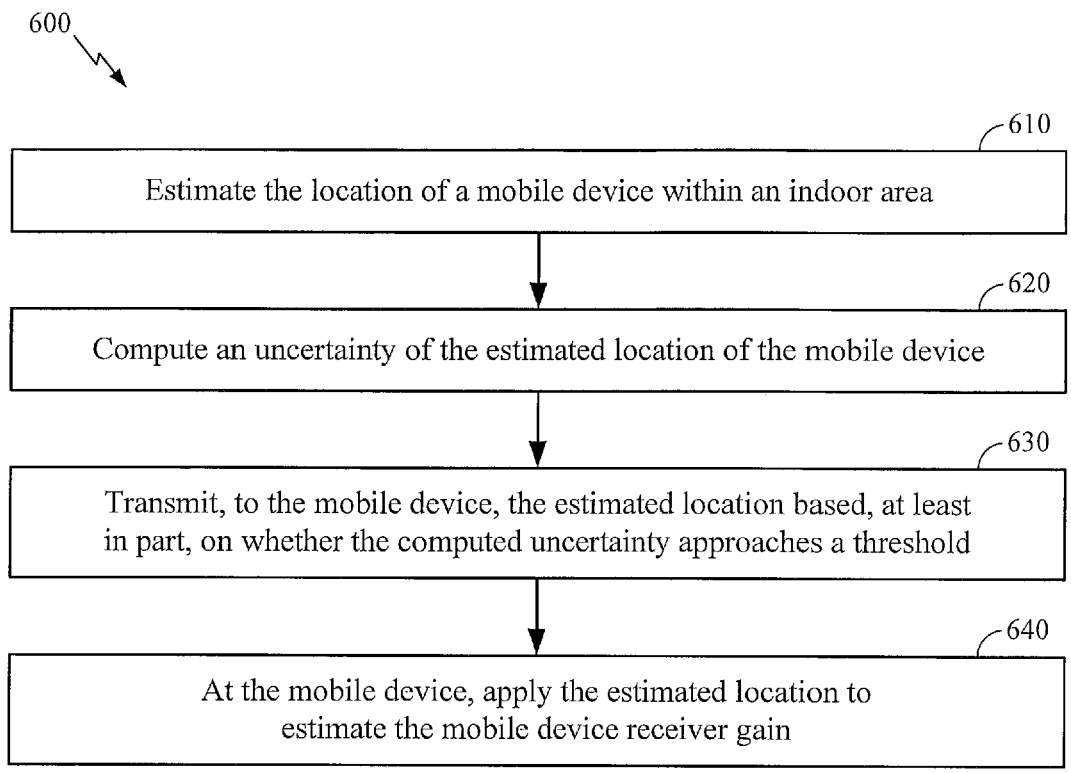
FIGS. 6-7 are flow diagrams for methods of positioning mobile devices using measured receiver gain according to embodiments.

FIG. 6 is a flow diagram 600 for a method for positioning mobile devices using measured receiver gain according to another embodiment. Although the method of FIG. 6 may be performed by, for example, mobile device 102 in communication with one or more wireless access points, such as access point 510 and access point 512 of FIG. 5, the method of FIG. 6 may be performed by other types of wireless devices in communication with one or more transceivers, and claimed subject matter is not limited in this respect. Example implementations, such as described in FIG. 6, may include actions or operations in addition to those shown in the blocks of diagram 600. Example implementations may also include fewer actions or operations, actions or operations occurring in a different order, or any combination thereof.

The method of FIG. 6 may begin at block 610 in which a network-based positioning resource, such as network-based positioning resource 530 of FIG. 5, estimates a location of one or more mobile devices within an indoor area. In embodiments, locations may be estimated with low uncertainty utilizing, for example, received signal strength indicators from mobile devices, round trip signal delay measurements for signals transmitted between or among mobile devices and wireless access points, or by way of other approaches. In particular embodiments, a location estimate of a mobile device may involve establishing ground truth based, at least in part, on input signals from an imaging device, such as a camera, to provide observations of one or more landmarks, such as doorways, entrances, exit signs, storefronts, or any other feature in an environment proximate to the mobile device. At 620, a network-based positioning resource may compute an uncertainty of an estimated location of a mobile device.

At 630, a network-based positioning resource may transmit one or more position estimates to a mobile device located within an indoor area based, at least in part, on whether position estimation uncertainty approaches a threshold value. In an embodiment, a ground truth estimate of a position of a mobile device may represent an example of a position estimate that approaches a threshold value. In embodiments, block 630 may represent an approach toward regulating or limiting occurrences in which network-based positioning resources may transmit unsolicited position updates to mobile devices. For example, in block 630, unsolicited position estimates provided based, at least in part, on whether position estimates are known with high confidence.

Responsive to receipt of a position estimate from a network-based positioning resource, a mobile device may compute an estimate of a mobile device receiver gain. In some embodiments, a position estimate from a network-based positioning resource may permit a mobile device to compute receiver gain based, at least in part, on differences between received signal strength values from a radio heatmap and observed RSSI values at the estimated location. For example, if a mobile device measures a relatively high value of received signal strength, a mobile device may estimate its location as, for example, proximate with a wireless access point. However, if a mobile device receives an estimated position from a network-based positioning resource indicating that the mobile device is likely located a considerable distance from the wireless access point, the mobile device may utilize the position estimate to estimate receiver gain. In a numerical example, if a mobile device measures a relatively high signal strength (e.g., approximately −30.0 dBm) the mobile device may estimate its location as being proximate with a wireless access point. If, however, a network-based positioning resource estimates, with high confidence, that the mobile device is at a location that is a considerable distance from the wireless access point (e.g., approximately 25.0 meters) the mobile device may utilize a radio heatmap to determine that a predicted signal strength at the location is a lesser value (e.g., approximately −45.0 dBm). Thus, the mobile device may subtract measured signal strength from signal strength predicted by the heatmap to compute receiver gain. This may be expressed as:

$$RSSI@MD - \text{Heatmap } RSSI = RX\text{gain} \qquad (2)$$

Figure 7:
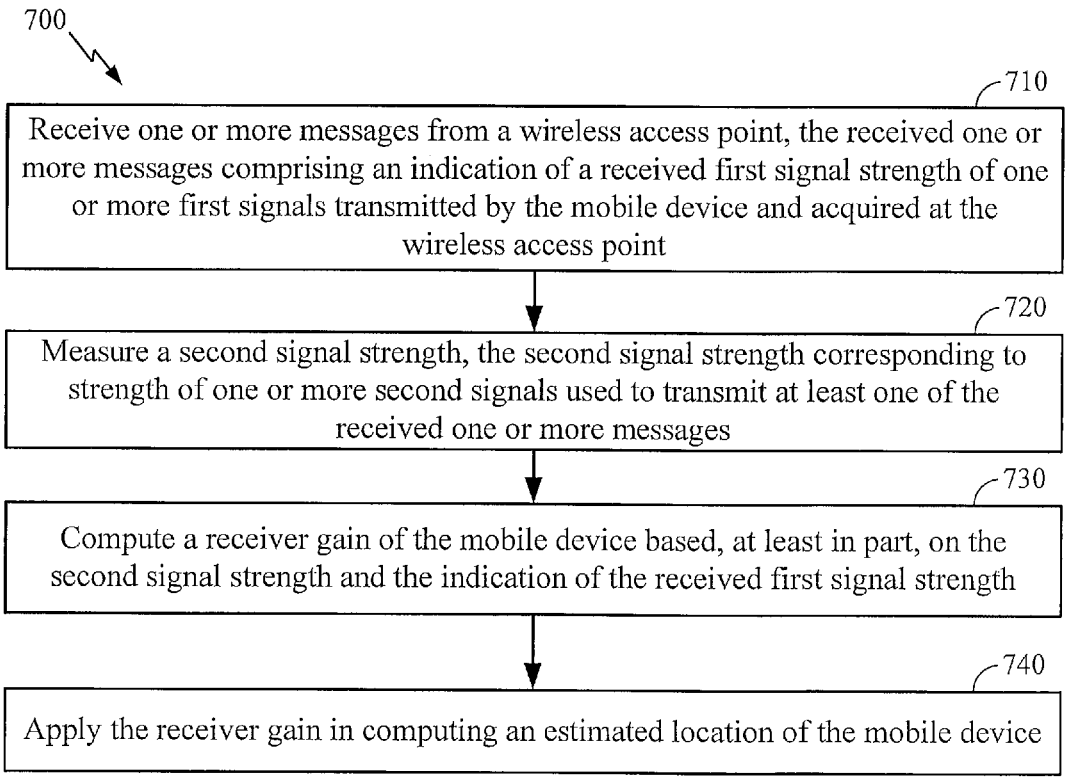
Figure 8:
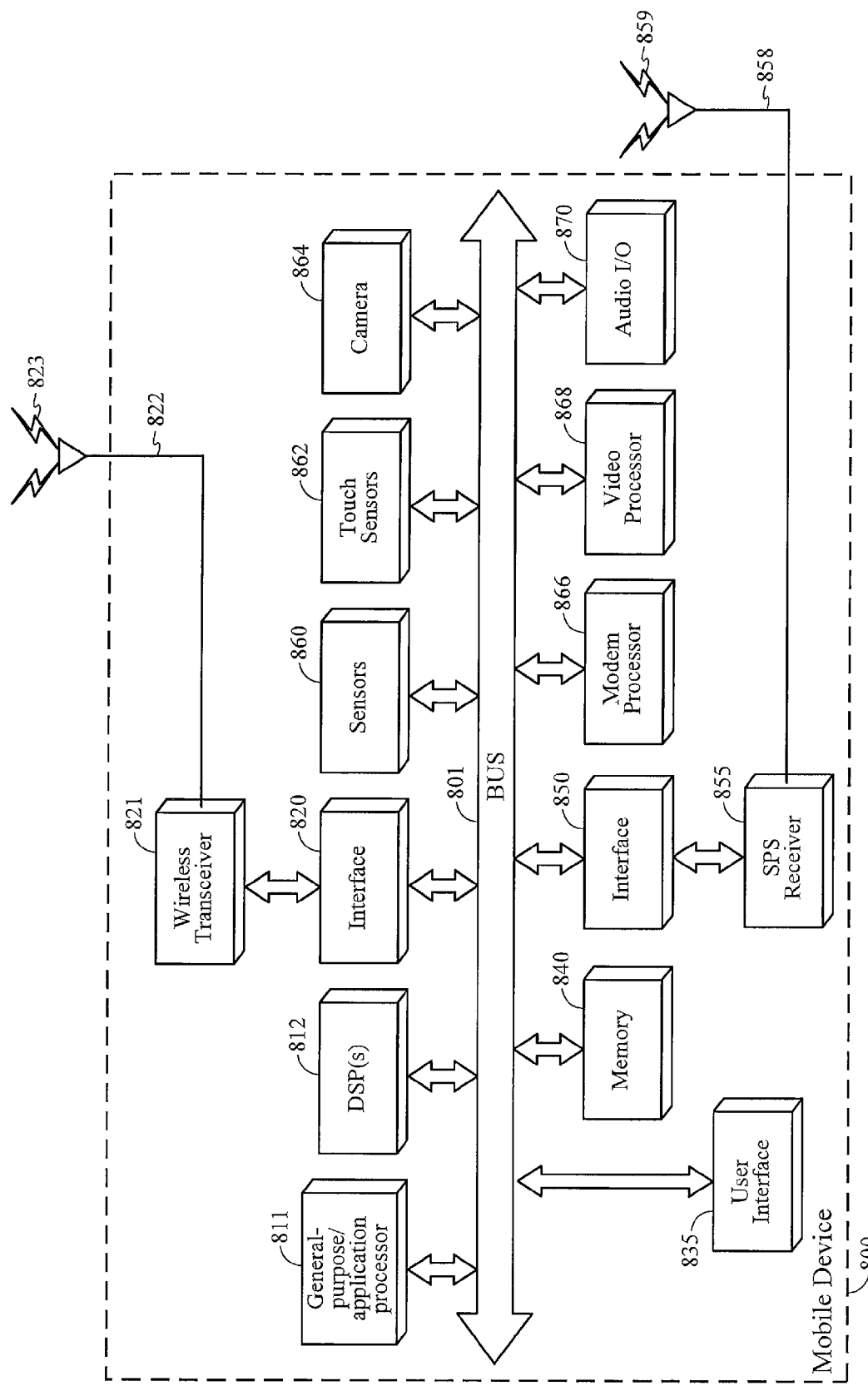
FIG. 8 is a schematic block diagram illustrating an exemplary device, in accordance with an embodiment.

FIG. 7 is a flow diagram 700 for a method of positioning mobile devices using measured receiver gain according to an embodiment. Although the method of FIG. 7 may be performed by, for example, mobile device 102 in communication with one or more wireless access points, such as access point 210 of FIG. 3, the method of FIG. 7 may be performed by other types of wireless devices in communication with one or more transceivers, and claimed subject matter is not limited in this respect. Example implementations, such as described in FIG. 7, may include actions or operations in addition to those shown in the blocks of diagram 700. Example implementations may also include fewer actions or operations, actions or operations occurring in a different order, or any combination thereof. The method of FIG. 7 may begin at block 710, which may comprise receiving one or more messages from a wireless access point, wherein the one or more messages may comprise an indication of a received first signal strength of a first signal transmitted by the mobile device and acquired at the wireless access point. The method may continue at block 720, which may comprise measuring a signal strength of a signal used to transmit at least one of the received one or more messages. At block 730, the method may continue with computing a receiver gain of the mobile device based, at least in part, on the second signal strength and the indication of the received first signal strength. At block 740, the method may conclude with applying the receiver gain in computing an estimated location of the mobile device FIG. 8 is a schematic diagram of a mobile device 800 according to an embodiment. Mobile device 102 (FIG. 1) may comprise one or more features of mobile device 800 shown in FIG. 8. In certain embodiments, mobile device 800 may also comprise wireless transceiver 821, which is capable of transmitting and receiving wireless signals 823 via antenna 822 over a wireless communication network. Wireless transceiver 821 may be coupled to bus 801 by way of wireless transceiver a bus interface. A wireless transceiver bus interface may, in some embodiments be at least partially integrated with wireless transceiver 821. Some embodiments may include, for example, multiple wireless transceivers 821 and wireless antennas 822 to enable transmitting and/or receiving signals according to corresponding multiple wireless communication standards for Wide Area Networks (WAN), Wireless Local Area Networks (WLAN), Personal Area Networks (PAN), etc. Such as, for example, versions of IEEE Std. 802.11, CDMA, WCDMA, LTE, UMTS, GSM, AMPS, Zigbee, and Bluetooth, just to name a few examples.

Mobile device 800 may also comprise SPS receiver 855 capable of receiving and acquiring SPS signals 859 via SPS antenna 858. SPS receiver 855 may also process, in whole or in part, acquired SPS signals 859 for estimating a location of mobile device 800. In some embodiments, general-purpose processor(s) 811, memory 840, DSP(s) 812 and/or specialized processors (not shown) may also be utilized to process acquired SPS signals, in whole or in part, and/or calculate an estimated location of mobile device 800, in conjunction with SPS receiver 855. Storage of SPS or other signals for use in performing positioning operations may be performed in memory 840 or registers (not shown).

Also shown in FIG. 8, mobile device 800 may comprise digital signal processor(s) (DSP(s)) 812 connected to the bus 801 by a bus interface. General-purpose processor(s) 811 may be connected to the bus 801 by way of a bus interface and memory 840. A bus interface may be integrated with the DSP(s) 812, general-purpose processor(s) 811 and memory 840. In various embodiments, functions may be performed in response execution of one or more machine-readable instructions stored in memory 840 such as on a computer-readable storage medium, such as RAM, ROM, FLASH, or disc drive, just to name a few example. The one or more instructions may be executable by general-purpose processor(s) 811, specialized processors, or DSP(s) 812. Memory 840 may comprise a non-transitory processor-readable memory and/or a computer-readable memory that stores software code (programming code, instructions, etc.) that are executable by processor(s) 811 and/or DSP(s) 812 to perform functions described herein. Memory 840 may comprise a database for storing radio signal strength values of a radio heatmap comprising a list of discrete locations of an indoor area and corresponding values of expected and/or predicted signal strength of electromagnetic signals transmitted from a wireless transmitter and received at the discrete locations.

Also shown in FIG. 8, a user interface 835 may comprise any one of several devices such as, for example, a speaker, microphone, display device, vibration device, keyboard, touch screen, just to name a few examples. In a particular implementation, user interface 835 may enable a user to interact with one or more applications hosted on mobile device 800. For example, devices of user interface 835 may store analog or digital signals on memory 840 to be further processed by DSP(s) 812 or general-purpose processor 811 in response to action from a user. Similarly, applications hosted on mobile device 800 may store analog or digital signals on memory 840 to present an output signal to a user. In implementations, a user may interact with user interface 835 to determine an estimated location of the mobile device. The estimated location may be determined by acquiring signals from one or more access points and comparing received signals with RSSI values from a radio heatmap. Responsive to transmission of probe request messages and receipt of probe response messages, for example, an estimated position within an indoor area may be rendered using video processor 868 for display on a display device.

In an implementation, mobile device 800 may include a dedicated audio input/output (I/O) device 870 comprising, for example, a dedicated speaker, microphone, digital to analog circuitry, analog to digital circuitry, amplifiers, and/or gain control. It should be understood, however, that this is merely an example of how an audio I/O may be implemented in a mobile device, and that claimed subject matter is not limited in this respect. In another implementation, mobile device 800 may comprise touch sensors 862 responsive to touching or pressure on a keyboard or touch screen device.

Mobile device 800 may also comprise a dedicated camera device 864 for capturing still or moving imagery. Camera device 864 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 811 or DSP(s) 812. Alternatively, a dedicated video processor 868 may perform conditioning, encoding, compression, or manipulation of signals representing captured images. Additionally, video processor 868 may decode/decompress stored image data for presentation on a display device (not shown) on mobile device 800.

Mobile device 800 may also comprise sensors 860 coupled to bus 801, which may include, for example, inertial sensors and environment sensors. Inertial sensors of sensors 860 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 860 may generate analog or digital signals that may be stored in memory 840 and processed by general purpose application processor 811 in support of one or more applications such as, for example, applications directed to positioning or navigation operations.

In a particular implementation, mobile device 800 may comprise a dedicated modem processor 866 capable of performing baseband processing of signals received and downconverted at wireless transceiver 821 or SPS receiver 855. Similarly, modem processor 866 may perform baseband processing of signals to be upconverted for transmission by wireless transceiver 821. In alternative implementations, instead of comprising a dedicated modem processor, baseband processing may be performed by a general-purpose processor or DSP (e.g., general purpose/application processor 811 or DSP(s) 812). It should be understood, however, that these are merely examples of structures that may perform baseband processing, and that claimed subject matter is not limited in this respect.

In a particular implementation, mobile device 800 may be capable of performing one or more of the actions set forth in the process of FIG. 8. For example, general-purpose application processor 811 may perform all or a portion of actions at blocks 410, 420, 430, 440, 450, 460, 470, 610, 620, 630, 640, 710, 720, 730, and/or 740.

Figure 9:
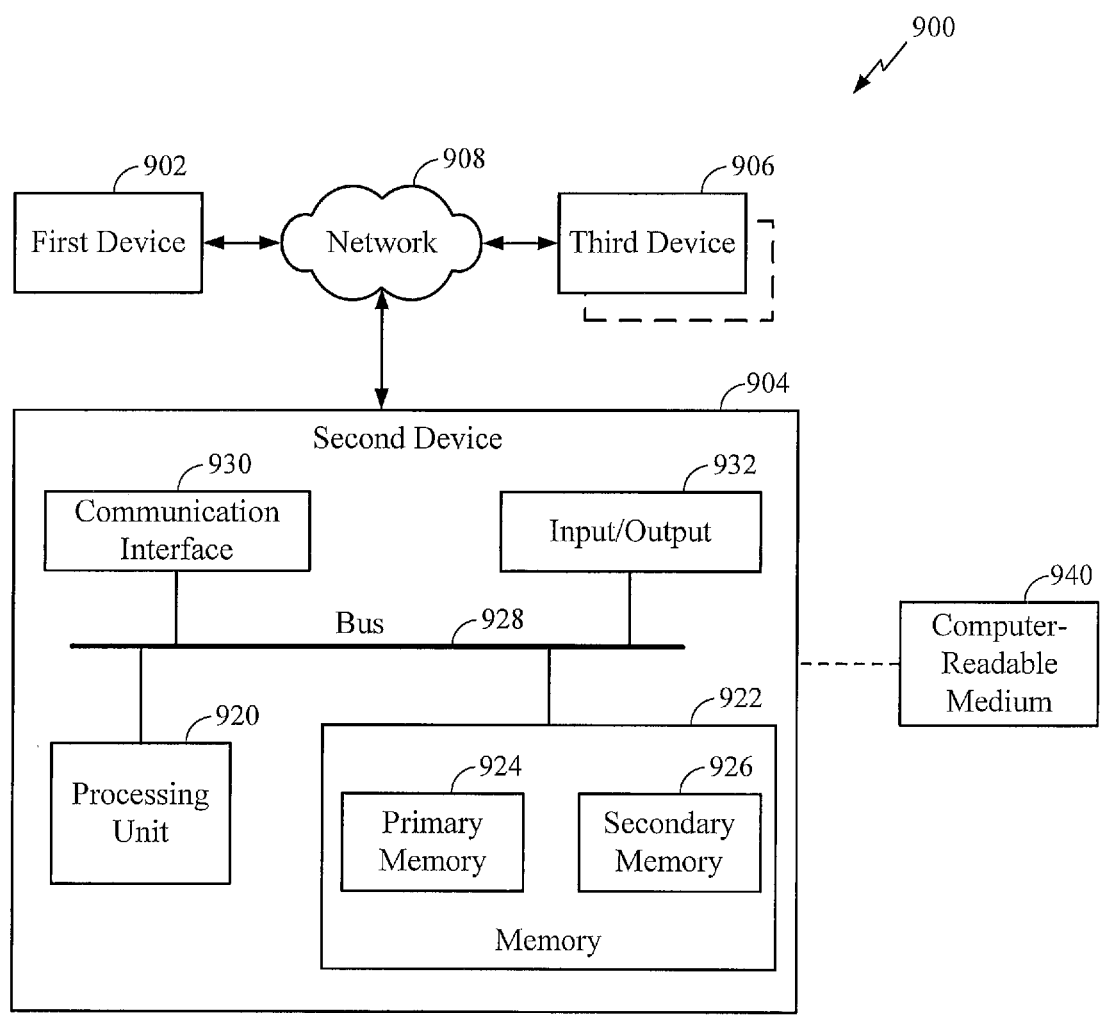
FIG. 9 is a schematic block diagram of an example computing platform in accordance with an embodiment.

FIG. 9 is a schematic diagram illustrating an example system 900 that may include one or more devices configurable to implement techniques or processes described above, for example, in connection with FIGS. 4, 6, and 7. System 900 may include, for example, a first device 902, a second device 904, and a third device 906, which may be operatively coupled through a wireless communications network 908. In an aspect, first device 902 may comprise a server capable of providing network-based position estimation. In another aspect, a mobile device may estimate a location based on probe request and probe response messages. Second and third devices 904 and 906 may comprise mobile devices, in an aspect. In addition, in an aspect, wireless communications network 908 may comprise one or more cellular base stations and/or wireless access points, for example. However, claimed subject matter is not limited in scope in these respects.

First device 902, second device 904 and third device 906, as shown in FIG. 9, may be representative of any device, appliance or machine (e.g., such as wireless transceiver 115 or servers 140, 150 or 155 as shown in FIG. 1) that may be configurable to exchange data over wireless communications network 908. By way of example but not limitation, any of first device 902, second device 904, or third device 906 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 902, 904, and 906, respectively, may comprise one or more of a base station almanac server, a base station, or a mobile device in accordance with the examples described herein.

Similarly, communications network 908 (e.g., in a particular of implementation of network 130 shown in FIG. 1), may be representative of one or more communication links, processes, or resources configurable to support the exchange of data between at least two of first device 902, second device 904, and third device 906. By way of example but not limitation, communications network 908 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 906, there may be additional like devices operatively coupled to wireless communications network 908. Thus, by way of example but not limitation, second device 904 may include at least one processing unit 920 that is operatively coupled to a memory 922 through a bus 928. It is recognized that all or part of the various devices and networks shown in system 900, and the processes and methods as further described herein, may be implemented using or otherwise including hardware, firmware, software, or any combination thereof.

Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any data storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

In particular implementation, second device 904 may be capable of rendering an estimated location of a mobile device. For example, second device 904 may receive parameters in messages receiving from a client STA, receiving STA and/or sending STA through communication network 908 for use in forming expressions for use in computing an estimated location of the client STA. In certain implementations, a transceiver (not shown) of a second device 904 may transmit an estimated location of second device 904 to first device 902. Responsive to computing an estimated location by measuring received signal strengths, computing receiver gain, and utilizing computed receiver gain to adjust values indicated on a radio heatmap, first device 902 may transmit an estimated location of second device 904. Second device 904 may display one or more estimated positions by way of a display device (not shown) coupled to, for example bus 928. Secondary memory 926 may include, for example, the same or similar type of memory as primary memory or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 940. Computer-readable medium 940 may include, for example, any non-transitory medium that can carry or make accessible data, code or instructions for one or more of the devices in system 900. Computer-readable medium 940 may also be referred to as a storage medium.

Second device 904 may include, for example, a communication interface 930 that provides for or otherwise supports the operative coupling of second device 904 to at least wireless communications network 908. By way of example but not limitation, communication interface 930 may include a network interface device or card, a modem, a router, a switch, a transceiver, and the like.

Second device 904 may include, for example, an input/output device 932. Input/output device 932 is representative of one or more devices or features that may be configurable to accept or otherwise introduce human or machine inputs, or one or more devices or features that may be configurable to deliver or otherwise provide for human or machine outputs. By way of example but not limitation, input/output device 932 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Memory 922 may represent any suitable or desired information storage medium. For example, memory 922 may include a primary memory 924 and a secondary memory 926. Primary memory 924 may include, for example, a random access memory, read only memory, etc. While illustrated in this example as being separate from a processing unit, it should be appreciated that all or part of primary memory 924 may be provided within or otherwise co-located/coupled with processing unit 920. Secondary memory 926 may include, for example, the same or similar type of memory as primary memory or one or more information storage devices or systems, such as, for example, a disk drive, an optical disc drive, a tape drive, a solid state memory drive, etc. In certain implementations, secondary memory 926 may be operatively receptive of, or otherwise enabled to be coupled to, a non-transitory computer-readable medium 940.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
   receiving one or more messages from a wireless access point, said received one or more messages comprising an indication of a received first signal strength of one or more first signals transmitted by said mobile device and acquired at said wireless access point;
   measuring a second signal strength, said second signal strength corresponding to strength of one or more second signals used to transmit at least one of said received one or more messages;
   computing a receiver gain of said mobile device based, at least in part, on said second signal strength and said indication of said received first signal strength; and
   applying said receiver gain to compute an estimated location of said mobile device.

2. The method of claim 1, wherein said applying said receiver gain to compute said estimated location of said mobile device further comprises:
   adjusting expected or predicted values of said received first signal strength using said computed receiver gain.

3. The method of claim 1, wherein said computing said receiver gain is based, at least in part, on an indication of transmission power employed at said mobile device to transmit said one or more first signals.

4. The method of claim 1, further comprising said mobile device computing said receiver gain based, at least in part, on an indication of transmission power used at said wireless access point to transmit one or more signals comprising at least one of said received one or more messages.

5. The method of claim 1, wherein said computing said receiver gain is based, at least in part, on antenna gain of one or more antennas used by said wireless access point to transmit one or more signals comprising said received one or more messages.

6. The method of claim 1, wherein said applying said receiver gain to compute said estimated location of said mobile device further comprises: computing said receiver gain substantially according to:

$RxGain = RSSI@MD - AP\ Tx\ power - (RSSI@AP - Mobile\ Tx\ power + APgain)$, where:

RSSI@MD represents said measured second signal strength;
   AP Tx power represents an indication of transmission power used at said wireless access point to transmit one or more signals comprising at least one of said received one or more messages;
   RSSI@AP represents said indication of said received first signal strength of said one or more first signals transmitted by said mobile device;
   Mobile Tx power represents an indication of transmission power employed at said mobile device to transmit said one or more first signals; and
   APgain represents an antenna gain.

7. The method of claim 6, wherein said RSSI@AP is derived, at least in part, from a link margin value indicated in a link measurement report frame.

8. The method of claim 1, further comprising:
   measuring a signal strength of one or more signals used to transmit one or more messages from said mobile device and received at said wireless access point.

9. A mobile device comprising:
   a receiver configured to acquire one or more signals from a communications channel, said one or more signals used to transmit one or more messages from a communications network; and
   one or more processors coupled to said receiver, configured to:
   measure, at said mobile device, a signal strength of said one or more signals acquired from said communications channel;
   compute a receiver gain of said mobile device based, at least in part, on said signal strength measured at said mobile device of one or more signals acquired from said communications channel and an indication of signal strength of one or more signals measured at a wireless access point, said indication of signal strength measured at said wireless access point being provided using said one or more messages; and
   apply said receiver gain to compute an estimated location of said mobile device.

10. The mobile device of claim 9, wherein said one or more processors are additionally configured to:
    adjust expected or predicted values of received signal strength of one or more signals transmitted by said mobile device and received at said wireless access point using said computed receiver gain.

11. The mobile device of claim 9, wherein said one or more processors are additionally configured to:
    compute said receiver gain based, at least in part, on an indication of transmission power employed at said mobile device to transmit said one or more signals measured at said wireless access point.

12. The mobile device of claim 9, wherein said one or more processors are additionally configured to:
    compute said receiver gain based, at least in part, on an indication of transmission power used at said wireless access point to transmit one or more signals comprising at least one of said one or more messages.

13. The mobile device of claim 9, wherein said one or more processors are additionally configured to:
    compute said receiver gain based, at least in part, on antenna gain of one or more antennas used by said wireless access point to transmit said one or more signals for providing said one or more messages.

14. The mobile device of claim 9, wherein said one or more processors are additionally configured to:
    compute said receiver gain substantially according to:

$RxGain = RSSI@MD - AP\ Tx\ power - (RSSI@AP - Mobile\ Tx\ power + APgain)$, where:

RSSI@MD represents said signal strength measured at said mobile device;

AP Tx power represents an indication of transmission power used at said wireless access point to transmit said one or more signals comprising at least one of said one or more messages;

RSSI@AP represents said indication of said signal strength measured at said wireless access point;

Mobile Tx power represents an indication of transmission power employed at said mobile device to transmit said one or more signals comprising said signal strength measured at said wireless access point; and APgain represents an antenna gain.

15. The mobile device of claim 14, wherein said one or more processors are additionally configured to:

compute said RSSI@AP, at least in part, from a link margin value indicated in a link measurement report frame.

16. An article comprising:

a non-transitory storage medium comprising machine-readable instructions stored thereon which are executable by one or more processors of a mobile device, comprising: code to obtain of one or more messages received from a communications channel;

code to measure a signal strength at said mobile device of one or more signals used to transmit at least one of said received one or more messages;

code to compute a receiver gain of said mobile device based, at least in part, on said signal strength measured at said mobile device and an indication of signal strength of one or more signals transmitted by said mobile device and measured at a wireless access point, said indication of said signal strength measured at said wireless access point being provided in at least one of said received one or more messages; and code to apply said receiver gain to compute an estimated location of said mobile device.

17. The article of claim 16, wherein said non-transitory storage medium further comprises:

code to adjust expected or predicted values of received signal strength using said computed receiver gain.

18. The article of claim 16, wherein said non-transitory storage medium further comprises:

code to compute said receiver gain based, at least in part, on an indication of transmission power employed at said mobile device to transmit
said one or more signals transmitted by said mobile device and acquired at said wireless access point.

19. The article of claim 16, wherein said non-transitory storage medium further comprises:

code to compute said receiver gain based, at least in part, on an indication of transmission power used at said wireless access point to transmit said one or more signals comprising said at least one of said received one or more messages.

20. The article of claim 16, wherein said non-transitory storage medium further comprises:

code to compute said receiver gain based, at least in part, on antenna gain of one or more antennas used by said wireless access point to transmit said one or more signals comprising said at least one of said received one or more messages.

21. The article of claim 16, wherein said non-transitory storage medium further comprises:

code to compute said receiver gain substantially according to: RxGain=RSSI@MD−AP Tx power−(RSSI@AP−Mobile Tx power+APgain), where:

RSSI@MD represents said signal strength measured at said mobile device of said one or more signals comprising said at least one of said received one or more messages;

AP Tx power represents an indication of transmission power used at said wireless access point to transmit said one or more signals comprising said at least one of said received one or more messages;

RSSI@AP represents said indication of said signal strength measured at said wireless access point;

Mobile Tx power represents an indication of transmission power employed at said mobile device to transmit said one or more signals; and APgain represents an antenna gain.

22. The article of claim 21, wherein said non-transitory storage medium further comprises:

code to derive said RSSI@AP, at least in part, from a link margin value indicated in a link measurement report frame.

23. A mobile device, comprising:

means for receiving one or more messages from a communications channel;

means for measuring at said mobile device a signal strength of one or more first signals used to transmit at least one of said received one or more messages;

means for computing a receiver gain of said mobile device based, at least in part, on said signal strength measured at said mobile device of said one or more first signals and an indication of signal strength measured at a wireless access point of one or more second signals transmitted by said mobile device, said indication of signal strength measured at said wireless access point being provided in said received one or more messages; and means for applying said receiver gain to compute an estimated location of said mobile device.

24. The mobile device of claim 23, further comprising:

means for computing said estimated location using a heatmap overlaid on a digital map based, at least in part, on a received signal strength indication adjusted based, at least in part, on said computed receiver gain.

25. The mobile device of claim 23, further comprising:

means for adjusting expected or predicted values using said computed receiver gain.

26. The mobile device of claim 23, wherein said means for computing said receiver gain utilizes an indication of transmission power employed at said mobile device to transmit said one or more second signals.

27. The mobile device of claim 23, wherein said means for computing said receiver gain utilizes an indication of transmission power used at said wireless access point to transmit said one or more first signals comprising said at least one of said received one or more messages.

28. The mobile device of claim 23, wherein said means for computing said receiver gain utilizes antenna gain of one or more antennas used by said wireless access point to transmit said one or more first signals comprising at least one of said one or more messages.

29. The mobile device of claim 23, wherein said means for applying said receiver gain to compute said estimated location of said mobile device further comprises:

means for computing said receiver gain substantially according to:

$$RxGain=RSSI@MD-AP\ Tx\ power-(RSSI@AP-Mobile\ Tx\ power+APgain),\ where:$$

RSSI@MD represents said signal strength measured at said mobile device of said one or more first signals;

AP Tx power represents an indication of transmission power used at said wireless access point to transmit said one or more first signals comprising said at least one of said received one or more messages;

RSSI@AP represents said indication of said signal strength measured at said wireless access point:

Mobile Tx power represents an indication of transmission power employed at said mobile device to transmit said one or more second signals; and APgain represents an antenna gain.

30. The mobile device of claim 29, further comprising: means for deriving said RSSI@AP from a link margin value indicated in a link measurement report frame.

* * * * *